Nov. 5, 1963 H. T. WINCHEL 3,109,941

TIMING CIRCUIT

Filed Oct. 13, 1959

INVENTOR:
Henry T. Winchel

By Smyth & Roston

Attorneys,

United States Patent Office 3,109,941

Patented Nov. 5, 1963

3,109,941
TIMING CIRCUIT

Henry T. Winchel, Culver City, Calif., assignor to Consolidated Electronics Industries Corp., New York, N.Y., a corporation of Delaware Filed Oct. 13, 1959, Ser. No. 846,175
14 Claims. (Cl. 307—88.5)

Figure 1:
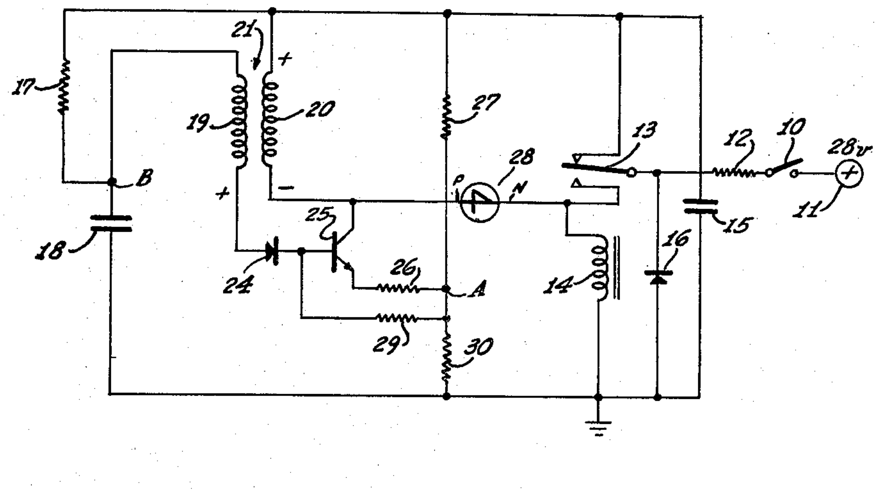

This invention relates to timing circuitry and, more particularly, to electronic circuitry for indicating with precision a particular period of time. The invention is especially concerned with electronic circuitry for indicating a particular period during which voltage is applied from a source.

In many applications, it is desirable or even necessary to measure a period of time with a considerable degree of precision. For example, it may be desired in an industrial process to introduce precise amounts of a number of different materials to a mixing chamber so that a product with optimum properties is obtained. In order to provide the proper amount of each material in the mixture, it may be necessary to precisely control the duration during which each material is introduced to the mixture.

This invention provides a circuit which measures the amount of time that voltage is supplied from a source. When the voltage is supplied for a particular period of time, the circuit provides an indication of the period of time, the circuit provides an indication of the termination of the period. In one specific illustrative embodiment of this invention, when voltage is applied to the timing circuitry, a capacitor arrangement is charged to forward bias a diode after a predetermined interval. The voltage applied to the timing circuitry is coupled through a voltage divider arrangement to the cathode of the diode, and the anode of the diode is, in turn, connected to the capactive arrangement. When the diode is forward biased, it turns on a junction transistor associated therewith, which forms part of a blocking oscillator. During the first cyclic operation of the oscillator, the oscillator develops a potential for operating a control member. The control member is serially connected with the winding of an output relay. When the control member breaks down, the relay operates to provide an indication that the voltage has been applied to the circuit for the particular predetermined interval.

Features of this invention pertain to the provision of a high impedance charging path and a low impedance discharging path for the capacitive arrangement to accurately control the interval before the operation of the oscillator. The diode forms part of the low impedance discharge path.

Other features of this invention relate to the provision of means for maintaining the accuracy of the timer at relatively high temperatures. At relatively high temperatures, the leakage currents of the transistor increases, so that the trigger action accuracy is affected. In order to provide for the timer accuracy at relatively high temperatures, cascaded silicon transistors are utilized which have smaller leakage currents than germanium transistors. The silicon transistors are cascaded to compensate for the smaller gain provided by silicon transistors. The gain provided by silicon transistors decreases with decrease of temperature. Means however are provided to compensate for the decrease of the gain to maintain the timer accuracy. The means includes thermistors for automatically adjusting the transistor bias potentials.

Further features of this invention pertain to the provision of a storage device which functions as a current supply when the control member breaks down. The control member serves to increase the timing accuracy by isolating the output relay from the transistor oscillator.

Figure 2:
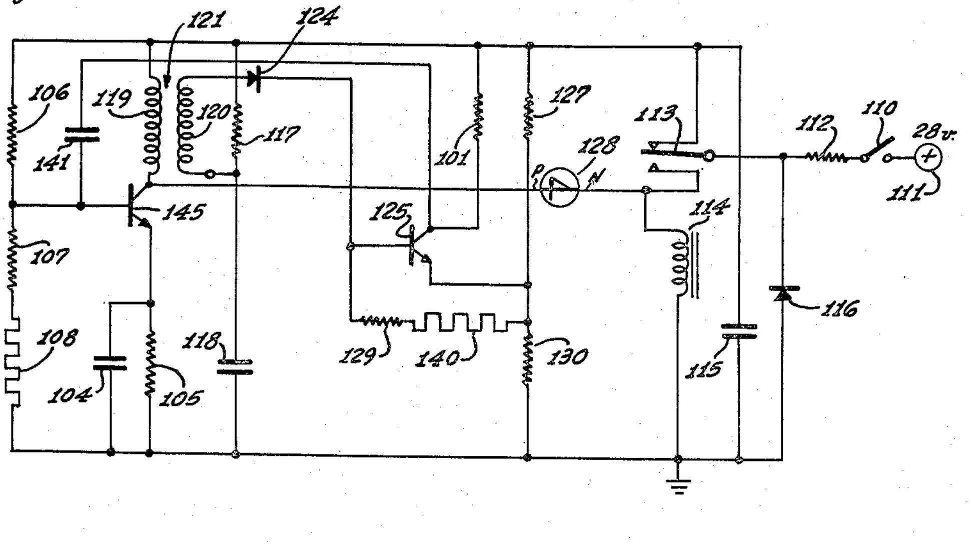

Further advantages and features of this invention will be apparent upon consideration of the following description when read in conjunction with the accompanying drawing in which:

FIGURE 1 is a circuit diagram of an electronic timer constituting one embodiment of this invention; and FIGURE 2 is a circuit diagram of an electronic timer constituting a second embodiment of this invention which maintains the timer accuracy at increased temperatures.

In the embodiment shown in FIGURE 1, a source 11 is adapted to provide a suitable direct voltage such as approximately 28 volts. The source 11, which may be a battery or any other suitable means for providing a direct voltage, has its positive terminal connected to the stationary contact of a single pole switch 10. When the movable arm of the switch 10 is operated to complete a connection from the source 11, the source 11 initiates the timing interval of the electronic timer depicted in FIGURE 1.

The movable arm of the switch 10 is connected by a resistor 12, having a suitable value such as 450 ohms, to the movable arm of a double-throw switch 13 which is magnetically coupled to, and controlled by, a relay winding 14. When the relay winding 14 is normal, or not energized, the movable arm of the switch 13 completes a connection from the resistor 12 through the upper contact of the switch 13 to a resistor 17. The resistor 17, which may have a suitable value such as 5 megohms, is part of a capacitive arrangement which also includes a capacitor 18 having a suitable value such as 100 microfarads. The resistor 17 is serially connected with the capacitor 18 between the upper contact of the switch 13 and a ground connection. The potential across the capacitor 18 increases at an exponential rate determined mainly by the values of the resistor 17 and the capacitor 18.

The potential actually applied across the series capacitive arrangement is less than 28 volts and is determined by a Zener diode 16. The cathode of the diode 16 is connected to the junction between the resistor 12 and the movable arm of the switch 13, and the anode of the diode 16 is connected to the ground connection.

The Zener diode 16, which may be of the type manufactured by the Texas Instrument Company or the International Rectifier Company, has a 20 volt Zener voltage. If the potential at its cathode is positive with respect to the potential at its anode, the diode 16 presents a relatively high impedance for potential differences less than 20 volts. When a potential greater than 20 volts is applied, such as the plus 28 volt potential from the source 11, the diode 16 breaks down with the potential across its terminals remaining at its Zener voltage of 20 volts. For any minor variations of the input voltage source 11, the potential at the movable arm of the switch 13 is, therefore, constant or regulated at plus 20 volts. The 20 volts potential is coupled across the series arrangement, described above, including the resistor 17 and the capacitor 18.

The 20 volt potential across the diode 16 is also coupled by the switch 13 across a voltage divider consisting of a resistor 27 and a resistor 30. The resistor 27 may have a suitable resistance such as 10 kilohms and the resistor 30 may have a suitable resistance such as 15 kilohms. With these values, the potential at the junction A of the two resistors changes to plus 12 volts when the switch 10 is closed.

The junction A of the voltage divider and the junction B between the serially connected resistor 17 and the capacitor 18 are connected to opposite sides of gating means in the form of a diode 24. The diode 24 may illustratively be a diode 1N461 manufactured by the Hughes Aircraft Co. The cathode of the diode 24 is connected by a resistor 29 to the junction A between the resistors 27 and 30, and the anode of the diode 24 is connected by a winding 19 of a transformer 21 to the junction B between the resistor 17 and the capacitor 18. The resistor 29 may have a suitable value such as 22 kilohms. The potential at the cathode of the diode 24 is sufficiently positive to reverse bias to the diode 24 for a predetermined interval depending upon the time constant of the capacitive arrangement including the resistor 17 and the capacitor 18. With circuit parameters of 5 megohms and 100 microfarads, the time constant of the arrangement is 500 seconds.

When the potential at the anode of the diode 24 increases to a magnitude which is somewhat greater than the potential at the cathode of the diode, the diode 24 becomes forward biased. The time constant of the capacitive arrangement may be increased by increasing the value of either the resistor 17 or the capacitor 18. By utilizing a relatively large valued resistor 17, the value of the capacitor 18 may be relatively small. The physical size or bulk of the capacitor 18 increases materially for larger capacitive values. The charging time constant of the capacitive arrangement is not affected by the connection to the diode 24 because the diode 24 presents a relatively large impedance when it is reverse-biased. The diode 24 therefore permits the utilization of a large resistor 17 to provide for the large time constant. In the absence of the diode 26, increasing the size of the resistor 17, which would be coupled to a relatively small impedance, would be ineffective to materially increase the time constant. In addition to being connected to the junction A of the voltage divider, the cathode of the diode 24 is also connected to the base electrode of a junction transistor 25. The transistor 25 may be an NPN junction transistor of the type 2N284 manufactured by Hughes Aircraft Co. The emitter electrode of the transistor 25 is connected by an emitter resistor 26, having a suitable value such as 330 ohms, to the junction A between the resistors 27 and 30. Since both the base and emitter electrodes of the transistor 25 are connected respectively by the resistors 29 and 26 to the same potential point at the junction A of the voltage divider, the transistor 25 remains non-conductive during the time that the diode 24 is reverse-biased.

When the capacitor 18 charges to a potential greater than the potential at the junction A of the voltage divider, the diode 24 becomes forward biased and current flows through the winding 19, the diode 24 and the resistors 29 and 30. The current through the resistor 29 develops a biasing potential across the base-to-emitter junction of the transistor 25 causing it to become conductive. The collector electrode of the transistor 25 is connected to a winding 20 of the transformer 21. The winding 20, which may have the same number of turns as the winding 19, develops a positive pulse across the winding 19 at the anode of the diode 24. One end of the winding 20 is connected to the collector electrode of the transistor 25 and the other end of the winding 20 is connected to the resistor 17 and to the upper contact of the switch 13.

The positive pulse coupled back to the anode of the diode 26 functions to increase the conductivity of the transistor 25. The voltage feedback by the transformer 21 is therefore a positive feedback voltage which establishes a regenerative action to rapidly saturate the transistor 25.

The transistor 25 actually forms part of an oscillator which is damped by a two-terminal control member 28 connected to the collector electrode of the transistor 25. A terminal P of the member 28 is connected to the collector electrode and a terminal N is connected to the relay winding 14. Ignoring for the moment the connection of the collector electrode to the control member 28, when the transistor 25 becomes conductive, the capacitor 18 discharges through the diode 24, the base-to-emitter junction of the transistor 25 and the resistors 26 and 30. The time constant of the discharge circuit including the capacitor 18 is relatively small compared to the charging time constant because the magnitude of the capacitor 18 and the impedances in the discharge path are relatively small, whereas the resistor 17 is relatively large. The capacitor 18, therefore, discharges at a faster rate than it charges so that the potential at the anode of diode 24 due to the capacitor 18, decreases. When the capacitor 18 has discharged somewhat, and the feedback pulse terminated, the diode 24 becomes reverse-biased to turn off the transistor 25 and repeat the cycle.

The oscillation of the oscillator including the transistor 25 is, however, damped during the first half cycle due to the operation of the control member 28 connected to the collector electrode of the transistor 25. The control member 28 may be a four-layer semiconductor diode of the type described by William Shockley in an article on The Unique Properties of the Four-Layer Diode in Electronics Industries, August 1957. Briefly, the four-layer diode is a two-terminal device having two operating conditions: an "open" or low conductance state corresponding to approximately 100 megohms; and a "closed" or high conductance state corresponding to approximately 3 ohms. When the voltage across the member or diode 28 exceeds a predetermined breakdown potential in the direction indicated by the slanted line for the symbol of the diode 28, the diode 28 assumes its low impedance condition. The breakdown potential may illustratively be 25 volts and the diode 28 may be of the type 4NZOD, manufactured by the Shockley Semiconductor Laboratory.

Before the transistor 25 becomes conductive, the potential at its collector anode and, therefore, across the diode 28, is 20 volts in the forward direction necessary to breakdown the diode 28, with its terminal P being at plus 20 volts and its terminal N being at ground potential. When the diode 24 becomes conducting to initiate the transistor oscillation, a positive pulse is coupled across the transformer 21 to the collector electrode. The collector potential becomes more positive than plus 20 volts to breakdown the diode 28.

As described above, one terminal of the diode 28 is connected to the collector electrode of the transistor 25 and the other terminal is connected to the grounded relay winding 14 and to the lower contact of the switch 13. When the diode 28 breaks down, there is a surge of current through the winding 20, the diode 28 and the relay winding 14. The current through the relay winding 14 causes it to operate the switch 13. The current through the winding 20 and the diode 28 to the winding 14 is provided over a path from the source 11 through the switch 10, the resistor 12 and the movable arm and the upper contact of the switch 13. The upper contact of the switch 13 is shunted to ground by a capacitor 15 which is charged to a potential of 20 volts during the time the capacitor 18 is being charged to forward bias the diode 26. The capacitor 15 functions as an additional source of energy for the relay winding 14.

When the relay winding 14 becomes energized, it operates the switch 13 to interrupt the charging path to the capacitor 18 and to establish a connection from the source 11 through the switch 10, the resistor 12 and the movable arm and lower contact of the switch 13, to the relay winding 14. The winding 14, therefore, remains energized over the locking path through the lower contact of the switch 13. The capacitor 18 discharges through the diode 24 and the transistor 25 as long as the transistor 25 remains conductive and, thereafter, through the resistor 29 and the resistor 30. When the switch 13 operates, it opens at its upper contact the charging path for the capacitor 18. After the transistor 25 becomes nonconducting and the diode 24 becomes reverse-biased, they remain in that condition until the switch 10 is opened to release the relay winding 14.

Thereafter, a closure of the switch 10 reinitiates the timing cycle. The transistor 25, in this manner, forms part of an oscillator which is damped during the first half cycle when the diode 28 breaks down. The diode 28 returns to its normal high impedance condition when the current reduces below a sustaining value due to the conduction through the transistor 25.

In the embodiment depicted in FIGURE 1, the accuracy of the timing is maintained for temperatures up to approximately 165 degrees Fahrenheit. For temperatures over 165 degrees Fahrenheit, the leakage currents through the transistor 25 function to reduce the timing interval by triggering the oscillator earlier in the charging operation of the capacitor 18. In the embodiment shown in FIGURE 2, however, the accuracy of the timed interval is maintained for temperatures in excess of 250 degrees Fahrenheit. The components in FIGURE 2 which are similar to the components in FIGURE 1 have similar reference designations with the addition of 100. The source 111, for example, is similar to the source 11 in FIGURE 1.

The source 111 is connected by a switch 110, which may be manually operated, to the resistor 112. The resistor 112 is, in turn, connected to the movable arm of the switch 113. When the relay winding 114 is not energized, the voltage from the source 111 is provided through the movable arm and the upper contact of the switch 113 across a voltage divider consisting of the resistors 127 and 130. The junction between the resistors 127 and 130 is connected to a series arrangement including a thermister 140 and a resistor 129 to the cathode of a diode 124. The thermister 140 has an impedance which varies inversely with temperature. As the ambient temperature increases, the resistance between the junction of the voltage divider and the cathode of the diode 124 is correspondingly decreased. The series arrangement including the resistor 129 and the thermister 140 is connected between the base and emitter electrodes of the transistor 125 so that the series impedance determines the base-to-emitter bias potential when the diode 124 becomes forward-biased. Since the impedance of the thermister 140 decreases with increase of temperature, the bias potential correspondingly decreases. The transistor 125 is a silicon transistor, which may be of the type 2N117 manufactured by the Texas Instrument Company. The gain provided by the silicon transistor 125 decreases with lower temepratures.

The anode of the diode 124 is connected through the winding 120 of a transformer 121 to the capacitor arrangement including the resistor 117 and the capacitor 118. The capacitor 118 is charged by the voltage from the source 111 through the switch 113 and the resistor 117. The diode 124, therefore, becomes forward biased after a predetermined interval determined by the capacitive arrangement. When the diode 124 becomes forward biased, the current through the diode 124 and the series arrangement including the resistor 129 and thermister 140 develops a biasing potential between the base and emitter electrodes of the transistor 125. The biasing potential developed across the serially connected resistor 129 and thermister 140 forward biases the base-to-emitter junction of the transistor 125 causing it to become conductive.

The timing arrangement depicted in FIGURE 2 includes a second silicon junction transistor 145 which becomes conductive as soon as the switch 110 is closed. The base circuit of the transistor 145 does not include a timing capacitive arrangement such as the one including the capacitor 118 which is connected by the diode 124 to the base electrode of the transistor 125. When the switch 110 is closed, the plus 20 volt potential appearing across the Zener diode 116 is coupled through the upper contact of the switch 113, across a voltage divider arrangement which includes the serially connected resistors 106 and 107 and a thermister 108. The resistors 106 and 107 may have suitable values such as, respectively, 150 kilohms and a value somewhat less than 10 kilohms. The resistor 107 and the thermister 108 together may provide for a resistance of 10 kilohms at 250° F. and a resistance of 1,000 kilohms at −65° F. The resistor 107 and the thermister 108 are part of a biasing arrangement for the transistor 145 because the base electrode of the transistor 145 is connected to the junction between the resistors 106 and 107. The emitter electrode of the transistor 145 is connected to ground through a resistor 105 and an emitter by-pass capacitor 104. The resistor 105 may have a suitable value such as 330 ohms and the capacitor 104 may have a suitable value such as 0.05 microfarad.

The collector electrode of the transistor 145 is connected by the secondary winding 119 of the transformer 121 to the upper contact of the switch 113. In this manner, when the diode 124 becomes forward biased under control of the timing capacitor arrangement, including the capacitor 118, it couples a control potential across the transformer 121 in addition to providing a biasing potential for turning on the transistor 125.

Before the transistor 125 becomes conductive, its collector electrode is at a potential of plus 20 volts due to its connection through a resistor 101 to the upper contact of a switch 113. The resistor 101 may have a suitable value such as 10 kilohms. When the transistor 125 becomes conductive, the potential at its collector rapidly decreases and a pulse is coupled from the collector electrode of the transistor 125 through a coupling capacitor 141 to the base electrode of the transistor 145. The negative pulse at the base electrode of the transistor 145 functions to reverse bias the base-to-emitter junction of the transistor 145 causing it to become non-conductive. As the transistor 145 becomes non-conductive, it couples a pulse across the transformer 121 to increase the conduction through the diode 124 and the transistor 125. Regenerative action is, therefore, established to drive the transistor 125 to saturation and to fully turn off the transistor 145. The two-transistor arrangement is actually a regenerative arrangement because in the absence of the connection of the control member 128 to the collector electrode of the transistor 145, the two transistors 125 and 145 would continue to alternatively become conductive and non-conductive. When the transistor 145, however, becomes non-conductive, the potential at its collector electrode increases to a value greater than plus 35 volts to break down the control member 128. The control member 128 may be a four-layer bi-stable transistor diode of the type described above and manufactured by the Beckman Instruments, Inc.

The control member 128 is serially connected with the relay winding 114 between the collector electrode of the transistor 145 and the ground connection. When the control member 128 breaks down, a surge of current is coupled through the relay winding 114 to operate the switch 113. The surge of current is aided by current from the capacitor 115 through the winding 119. When the switch 113 operates, it opens the charging path for the capacitor 118 and it closes a locking path through the lower contact of the switch 113 for the relay winding 114. The locking path is from the source 111 through the switch 110, the resistor 113 and the movable arm and lower contact of the switch 113 to the relay winding 114. The relay winding 114 remains energized as long as the switch 110 remains closed.

When the switch 113 is operated, it also increases the potential at the end terminal of the control member 128 to reduce the current through the control member 128 below its sustaining value so that it returns to its original high impedance condition. The capacitor 115 discharges through the voltage divider including the resistors 127 and 130, which also assists in discharging the capacitor 118. The capacitor 104 which is connected in the emitter circuit of the transistor 145 discharges through the resistor 105. The capacitor 104 is utilized to equalize the low impedance path through the relay winding 114 when the control member 128 is in its low impedance condition.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A timing circuit, including, capacitive means having a relatively high impedance charging path, and a relatively low impedance discharging path, said low impedance discharging path including an asymmetrically conducting impedance element, and amplifying means serially coupled to said asymmetrically conducting impedance element whereby the discharge current from said capacitor is provided through the serially coupled impedance element and amplifying means; means coupled to said asymmetrically conducting impedance element for maintaining said element reverse-biased until said capacitive means charges to a predetermined potential over said high impedance charging path and for thereafter providing a flow of current from the capacitive means through the amplifying means; an output device; a two condition control member coupled to said amplifying means and to said output device during the time said asymmetrically conducting impedance element is reverse-biased but for effectively connecting said output device to said amplifying means upon the forward biasing of said element and upon the introduction of a voltage greater than a particular value to the control member; and a transformer having a first winding coupled to the asymmetrical conducting impedance element and having a second winding coupled between the capacitive means and the control member to produce a pulse of voltage greater than the particular value upon the flow of current from the capacitive means through the amplifying means, for an effective connection of the amplifying means to the control member.

2. A timing circuit, including, capacitive means, means coupled to said capacitive means for providing a predetermined potential to said capacitive means, gating means coupled to said capacitive means and having a high and a low impedance condition, circuit means including said capacitive means and coupled to said gating means for maintaining said gating means in said high impedance condition for a predetermined interval after the operation of said providing means, amplifying means having a saturable state and coupled to said gating means and having biasing means responsive to said gating means for initiating the operation of said amplifying means when said gating means assumes said low impedance condition, a control member having a high impedance upon the introduction of voltages less than a particular value to the member and having a low impedance upon the introduction of voltages of at least the particular value to the member, output means operatively couped to the control member for providing an output indication upon the occurrence of a low impedance in the control member, and circuit means coupled to the amplifier means and to the control member and responsive to the operation of the amplifying means for producing a saturable state in the amplifying means and for introducing to the control member a voltage having at least the particular value upon the occurrence of the saturable state in the amplifying means.

3. A circuit responsive to the reception of an input voltage for providing an output indication after a predetermined control interval, including, a gated oscillator having a diode, a capacitive circuit arrangement responsive to the input voltage for maintaining said diode reversed-biased for a particular interval after the input voltage is received, and an amplifying device having saturable characteristics and coupled to said diode to become operative in amplifying current through said diode after the termination of said particular interval; a control member coupled to said amplifying device of said gated oscillator and having a normal high impedance condition and an operative low impedance condition, the condition of said control member changing from said normal to said operative condition during the first oscillation of said gated oscillator after the reception of the input voltage and upon the occurrence of the saturable characteristics in the amplifying device; an output indicator member coupled to said control member for providing an indication when the condition of said control member changes to said operative low impedance condition; and circuit means coupled to said amplifying device and said control member and responsive to the operation of said amplifying device for obtaining an operation of the amplifying device in the saturable state to produce an operation of the control member in the operative low impedance condition.

4. A timing circuit, including, capacitive means; a charging circuit for said capacitive means, including a source of potential of particular magnitude; a discharging circuit for said capacitive means and having a first condition with a high impedance relative to the impedance of said charging circuit and having a second condition with a low impedance relative to the impedance of said charging circuit, said discharging circuit including gating means coupled to and controlled by said capacitive means, regenerative amplifier means coupled to said gating means and responsive to the operation of said gating means for providing a flow of current when said gating means is operated by said capacitive means to change the condition of said discharging circuit from said high to said low impedance condition; a control member having a high impedance upon the introduction to the control member of voltages less than a particular value and having a low impedance upon the introduction to the control member of voltages at least equal to the particular value, output means operatively coupled to the control member for providing an output indication upon the occurrence of the low impedance in the control member, and circuit means connected to the amplifier means and to the control member and responsive to the flow of current through the amplifier means for increasing the current flow, the circuit means being constructed to produce a voltage dependent upon the rate of increase of current through the amplifier means and to obtain the introduction to the control member of the voltage having the particular value after the initiation of the current flow through the amplifying means.

5. A timing circuit in accordance with claim 4, wherein said regenerative amplifier means includes a transistor having base, emitter and collector electrodes, means connecting said base electrode to said gating means and a biasing impedance coupled between said base and said emitter electrode, and wherein said circuit means includes a transformer having one winding coupled to said collector electrode and said control member and having a second winding connected between said gating means and said capacitive means.

6. A timing circuit, including, capacitive means; a charging circuit for said capacitive means, including a source of potential of predetermined magnitude; and a discharging circuit for said capacitive means, and having a first condition with a high impedance relative to the impedance of said charging circuit and having a second condition with a low impedance relative to the impedance of said charging circuit, said discharging circuit including gating means coupled to and controlled by said capacitive means, and regenerative amplifier means coupled to said gating means and responsive to the operation of said gating means for providing a control potential upon the occurrences of a particular state of conductivity in the amplifying means; a two-condition control member coupled to said regenerative amplifier means and having a first condition with a high impedance and having a second condition with a low impedance and responsive to said control potential for changing from its first condition to its second condition; an output member coupled to said control member for providing an output indication when the condition of said control member is changed from the first condition to the second condition; and reactive circuit means coupled to the amplifier means and to the discharging circuit and to the control member and responsive to the discharge of the discharging circuit through the amplifier means for increasing the current to the particular value to obtain a change in the control members from the first condition to the second condition.

7. A timing circuit, including, capacitive means having a relatively high impedance charging path and having a relatively low impedance discharging path, said low impedance discharging path including an asymmetrically conducting impedance element, and amplifying means coupled to said asymmetrically conducting impedance element, said amplifier means including a transistor having base, emitter and collector electrodes and having saturable characteristics, means connecting said base electrode to said asymmetrically conducting impedance element, a biasing impedance coupled between said base and said emitter electrodes, and a transformer having a first winding coupled to said collector electrode and having a second winding coupled between said asymmetrically conducting impedance element and said capacitive means to obtain a flow of saturable current through the first winding and the collector and emitter, electrodes of the transistor upon an initial flow of current through the second winding and the base and emitter electrodes of the transistor; means coupled to said asymmetrically conducting impedance element for maintaining said element reverse-biased until said capacitive means charges to a predetermined potential over said high impedance charging path; an output device; and a two condition control member coupled to said collector electrode of said transistor and to said output device for effectively isolating said amplifying means from said output device before the flow of saturable current through said amplifying means and for effectively connecting said output device to said amplifying means upon the flow of saturable current through the amplifying means.

8. The timing circuit set forth in claim 7 in which a first resistor having a decreasing value with increases in temperature is connected between the base and emitter of the transistor to maintain an accuracy in the timing operation over an extended range of temperatures.

9. A timing circuit, including, capacitive means having a relatively high impedance charging path and having a relatively low impedance discharging path, said low impedance discharging path including an asymmetrically conducting impedance element, and amplifying means coupled to said asymmetrically conducting impedance element, said amplifier means including a transistor having base, emitter and collector electrodes and having saturable characteristics, means connecting said base electrode to said asymmetrically conducting impedance element, a biasing impedance coupled between said base and said emitter electrodes, said biasing impedance including a thermistor for increasing the bias with decrease of temperature, and a transformer having one winding coupled electrically to said collector electrode and having a second winding coupled electrically between said asymmetrically conducting impedance element and said capacitive means to produce a flow of saturating current through the first winding and the collector and emitter electrodes of the transistor upon a flow of current through the second winding and the base and emitter electrodes of the transistor; an output device; and a two condition control member coupled to said collector electrode of said transistor and to said output device for effectively isolating said amplifying means from said output device before the flow of saturating current through the collector and emitter electrodes of the amplifier means and for effectively connecting said output device to said amplifying means upon the flow of saturating current through the collector and emitter electrodes of the amplifier means.

10. A timing circuit, including, capacitive means, first means coupled to said capacitive means for introducing a particular potential to said capacitive means, gating means coupled to said capacitive means and having high and low impedance conditions, circuit means including said capacitive means and coupled to said gating means for maintaining said gating means in said high impedance condition for a particular interval after the operation of said first means, amplifying means including biasing means coupled to said gating means for operating said amplifying means upon the occurrences of a low impedance condition in said gating means, said biasing means including temperature compensating impedance means having a negative thermal coefficient of impedance for maintaining the gain of said amplifying means constant with variations of temperature, a control member having a high impedance upon the introduction to the control member of voltages less than a particular value and having a low impedance upon the introduction to the control member of voltages at least equal to the particular value; output means operatively coupled to the control member for providing an output indication upon the occurrence of a low impedance in the control member; and inductively reactive means operatively coupled to the amplifying means and to the control member to produce an increase in current through the amplifying means and the inductively reactive means upon the operation of said amplifying means and to introduce to the control member the voltage having the particular value in accordance with such increase in current.

11. A timing circuit, including, capacitive means, first means coupled to said capacitive means for introducing a particular potential to said capacitive means, gating means coupled to said capacitive means and having high and low impedance conditions, circuit means including said capacitive means and coupled to said gating means for maintaining said gating means in said high impedance condition for a particular interval after the operation of said first means, amplifying means coupled to said gating means and including biasing means for operating said amplifying means upon the occurrence of the low impedance condition in the gating means, said amplifying means also including a first and a second semi-conductor means and further including means operatively coupled to said first and second semi-conductor means for obtaining an alternate operation of said first and said second semi-conductor means when the condition of said gating means is changed from its high impedance condition to its low impedance condition, a control member having a high impedance upon the introduction to the control member of voltages less than a particular value and having a low impedance upon the introduction to the control member of voltages at least equal to the particular value, an output member coupled to the control member for providing an output indication upon the occurrence of a low impedance in the control member, and reactive circuit means coupled between the first and second semi-conductor means and connected to the control member and responsive to the alternate operations of the first and second semi-conductor means for introducing to the control member the voltage having the particular value to obtain the low impedance in the control member.

12. The combination set forth in claim 11, in which the circuit means includes a transformer with first and second windings and having one winding connected between the capacitive means and the gating means to control the operation of the first semi-conductor means and having a second winding connected to the second semi-conductor means and the control member to facilitate the alternate operations of the first and second semi-conductor means and the introduction to the control member of the voltage having the particular value.

13. A timing circuit, including, capacitive means, first means coupled to said capacitive means for introducing a particular potential to said capacitive means, gating means coupled to said capacitive means and having high and low impedance conditions, circuit means including said capacitive means and coupled to said gating means for maintaining said gating means in said high impedance condition for a particular interval after the operation of said first means until the production of a particular voltage across the capacitor means, amplifying means including biasing means coupled to said gating means for operating said amplifying means when said gating means assumes said low impedance condition, said amplifying means also including first and second semi-conductor means and further including means operatively coupled to the first and second semi-conductor means for obtaining an alternate operation of said first and said second semi-conductor means when the condition of said gating means is changed from its high impedance condition to its low impedance condition, said biasing means including first and second temperature compensating impedance means respectively connected to the first and second semi-conductor means for maintaining the gain provided by each of said first and said second semi-conductor means substantially constant with variations of the ambient temperature, a control member having a high impedance upon the introduction to the control member of voltages less than a particular value and having a low impedance upon the introduction to the control member of voltages at least equal to the particular value; an output member operatively coupled to the control member for providing an output indication upon the occurrence of the low impedance in the control member; and a transformer having a first winding connected between the capacitive means and the gating means to control the conductivity of the first semi-conductor means and having a second winding connected to the second semi-conductor means and to the control member to obtain the alternate operation of the first and second semi-conductor means and to obtain the production of the voltage having the particular value in the second semi-conductor means for introduction to the control member upon the occurrence of the low impedance in the gating means.

14. The timing circuit set forth in claim 13 in which the gating means constitutes a diode and in which each of the first and second semi-conductor means has a base, emitter and collector and in which the diode is connected to the base of the second transistor and in which the first and second temperature-compensating impedance means are connected between the base and emitter of their associated semi-conductor means and in which the first and second temperature-compensating impedance means constitutes resistors having values which decrease with increases in temperature.

References Cited in the file of this patent

UNITED STATES PATENTS

| | | |
|---|---|---|
| 2,801,374 | Svala | July 30, 1957 |
| 2,867,754 | O'Bleness | Jan. 6, 1959 |
| 2,923,863 | Chesson et al. | Feb. 2, 1960 |
| 2,981,898 | St. John | Apr. 25, 1961 |

FOREIGN PATENTS

| | | |
|---|---|---|
| 1,150,021 | France | July 29, 1957 |
| 1,161,135 | France | Mar. 17, 1958 |